US008228689B2

(12) United States Patent
Pfeifer

(10) Patent No.: US 8,228,689 B2
(45) Date of Patent: Jul. 24, 2012

(54) ACTIVE COMPONENTS ON AN INTERNAL CABLE TO IMPROVE SIGNAL INTEGRITY

(75) Inventor: Alan T. Pfeifer, Wichita, KS (US)

(73) Assignee: LSI Corporation, Milpitas, CA (US)

( * ) Notice: Subject to any disclaimer, the term of this patent is extended or adjusted under 35 U.S.C. 154(b) by 851 days.

(21) Appl. No.: 12/175,360

(22) Filed: Jul. 17, 2008

(65) Prior Publication Data

US 2010/0014598 A1    Jan. 21, 2010

(51) Int. Cl.
H05K 9/00    (2006.01)

(52) U.S. Cl. ............... 361/827; 333/28 R; 439/76.1; 174/268

(58) Field of Classification Search ............ 439/76.1; 361/827, 749; 174/117 F, 117 FF, 268; 327/552
See application file for complete search history.

(56) References Cited

U.S. PATENT DOCUMENTS

| 5,766,027 | A  | * | 6/1998 | Fogg ........................... 439/76.1 |
| 6,276,943 | B1 | * | 8/2001 | Boutros et al. ............... 439/76.1 |
| 6,617,939 | B1 | * | 9/2003 | Vermeersch ................. 333/28 R |
| 6,796,806 | B2 | * | 9/2004 | Boutros et al. ............... 439/76.1 |
| 7,244,126 | B2 | * | 7/2007 | Morana et al. ............... 439/76.1 |
| 7,276,986 | B2 | * | 10/2007 | Barr et al. ........................ 333/1 |
| 7,291,034 | B2 | * | 11/2007 | Wu ............................. 439/358 |
| 7,410,365 | B2 | * | 8/2008 | Wu ............................. 439/76.1 |
| 7,497,703 | B2 | * | 3/2009 | Fogg et al. ................... 439/108 |
| 2004/0150486 | A1 | * | 8/2004 | Barr et al. ........................ 333/1 |
| 2007/0134953 | A1 | * | 6/2007 | Morana et al. ............... 439/76.1 |

* cited by examiner

Primary Examiner — Dameon Levi
(74) Attorney, Agent, or Firm — William W. Cochran; Cochran Freund & Young LLC

(57) ABSTRACT

Disclosed is an internal cable system that communicates signals in an electronic device. The system uses a printed circuit board with active circuits that is connected to a standard communication cable. The printed circuit board is exposed to air flow from the cooling system of the electronic device for proper operation of the active components of the active circuits on the printed circuit board. The standard cable may include a SCSI internal cable or other similar signal communication cables. Signal integrity is enhanced using the active circuits that are mounted on the printed circuit board. Power is supplied to the printed circuit board through inactive conductors in the cable or conductors that would otherwise be used for grounding.

13 Claims, 3 Drawing Sheets

ACTIVE COMPONENTS ON AN INTERNAL CABLE TO IMPROVE SIGNAL INTEGRITY

BACKGROUND OF THE INVENTION

Cables are an integral part of modern communications and data processing devices. Cables are used both externally and internally to transmit electronic signals within various types of electronic systems. For example, serially attached SCSI (small computer system interface) cables are frequently used to transmit various types of SCSI signals. Although the electronics industry has taken great steps towards integration of various system functions, the need still exists to interconnect various subsystems within in a larger integrated system. Cables are frequently used for this purpose, including serially attached SCSI cables.

SUMMARY OF THE INVENTION

An embodiment of the present invention may therefore comprise a method of enhancing the integrity of signals transmitted in an electronic device over an internal cable comprising: providing a standard internal serial communication cable having standard connectors for transmitting the signals in the electronic device; attaching a printed circuit board to at least one of the standard connectors using a mechanical connector that securely mounts the printed circuit board to the at least one standard connector so that the printed circuit board is not enclosed within a casing, but is exposed to air flow from a cooling system of the electronic device; increasing signal integrity of the signals transmitted over the internal cable using active components provided on the printed board.

An embodiment of the present invention may therefore further comprise an internal cable system that enhances signal integrity of signals transmitted over the internal cable system in an electronic device comprising: a standard internal communication cable having standard connectors that transmit the signals in the electronic device; a printed circuit board that is mechanically and electrically connected to at least one of the standard connectors so that the printed circuit board is exposed to air flow from a cooling system; at least one active component circuit disposed on the printed circuit board that processes the signals transmitted over the internal cable system and enhances signal integrity of the signals.

An embodiment of the present invention may therefore further comprise a method of enhancing the integrity of signals transmitted in an electronic device over an internal cable comprising: connecting a first portion of a printed circuit board to a wire cable; connecting passive components to the first portion of the printed circuit board; attaching active components to a second portion of the printed circuit board; over-molding a plastic covering over the first portion of the printed circuit board so that the second portion of the printed circuit board is not enclosed within the plastic covering, but is exposed to air flow from a cooling system of the electronic device; increasing signal integrity of the signals transmitted over the internal cable using the active components that are attached to the printed board.

An embodiment of the present invention may therefore further comprise an internal cable system that enhances signal integrity of signals transmitted over the internal cable system in an electronic device comprising: a wire cable; a printed circuit board that has a first portion that is connected to the wire cable and a second portion; at least one active component circuit disposed on the second portion of the printed circuit board that processes signals transmitted over the internal cable system and enhances signal integrity of the signals; over-molding formed over the first portion of the printed circuit board to form a covering over the first portion of the printed circuit board to hold the printed circuit board in a stationary position with respect to the over-molding, and allow the second portion of the printed circuit board to be exposed to cooling from the electronic device.

DETAILED DESCRIPTION OF THE EMBODIMENTS

Figure 1:
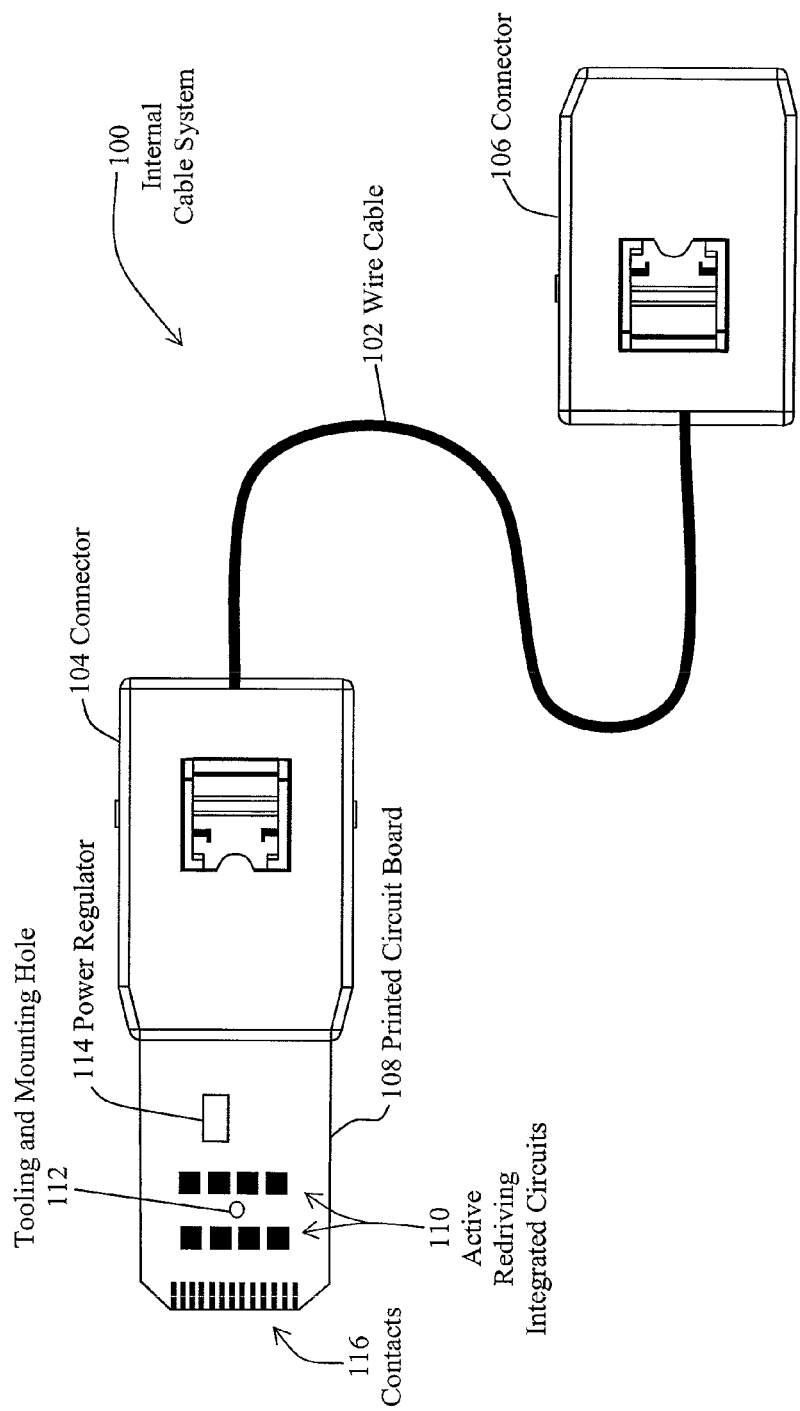
FIG. 1 is a schematic illustration of one embodiment of an internal cable system.

FIG. 1 illustrates an internal cable system 100 that includes active redriving circuitry to enhance signal integrity of signals transmitted in an electronic device over the internal cable system 100. Typical electronic devices may include computers, servers, routers, RAID systems, etc. The internal cable system 100 is illustrated in the embodiment of FIG. 1 as an internal serially attached SCSI cable system. Serially attached SCSI cable systems may employ passive components that are embedded in the over-molded plastic of the connectors, such as connector 104 illustrated in FIG. 1. However, passive components often do not supply the signal integrity that is desirable in an internal cable system. To otherwise achieve the desired signal integrity, current solutions would require a secondary circuit board assembly with active components and an extra connector to supply input/output signals from the printed circuit board assembly to the desired location. Such a solution requires added cost and additional cabling. Modification of the components in a connector 104 to include active redriving components is not achievable because heat dissipation of active components in an over-molded connector, such as connector 104, is a serious problem.

In the embodiment of FIG. 1, a printed circuit board 108 is provided that includes active components. The printed circuit board 108 is mechanically connected to the over-molded connector 104 and extends past the over-molded connector 104 so that the components mounted on the printed circuit board 108 are open to the cooling airflow system of the electronic device in which the internal cable system 100 is used. As shown in FIG. 1, the printed circuit board 108 may have a power regulator 114. Power may be passed through one of the pins that would normally be used as a grounding pin. Further, another ground pin in the power port of the electronic device can be used as a voltage detection circuit that enables the switching of power to a lead in the internal cable system that carries power whenever powered ports are used in the electronic device.

Power regulator 114 of FIG. 1 regulates the power to the active redriving integrated circuits 110. Active redriving integrated circuits 110 amplify and condition the signals that are received from the wire cable 102 and connector 104 to supply these signals to connector 116. The signal to noise ratio of the signals is greatly enhanced by active redriving integrated circuits 110. In addition, crosstalk may be minimized by using an active equalizer that utilizes active subtraction techniques that minimize crosstalk. The active redriving integrated circuits 110 may comprise built-in drivers, repeaters, equalizers, active filters, as well as electro-optical converters and optical transceivers. In fact, any known active signal conditioning or translation process can be used on the signals that are transmitted via the internal cable system 100 using the active redriving integrated circuits 110.

Also, as shown in FIG. 1, a tooling and mounting hole 112 is formed in the printed circuit board 108. After the printed circuit board 108 has been inserted into a socket in the electronic device such that the contacts 116 are electrically connected in the socket (not shown) of the electronic device (not shown), the tooling and mounting hole 112 can be used to hold the printed circuit board 108 in place so that the printed circuit board 108 does not become disconnected from the socket.

Figure 2:
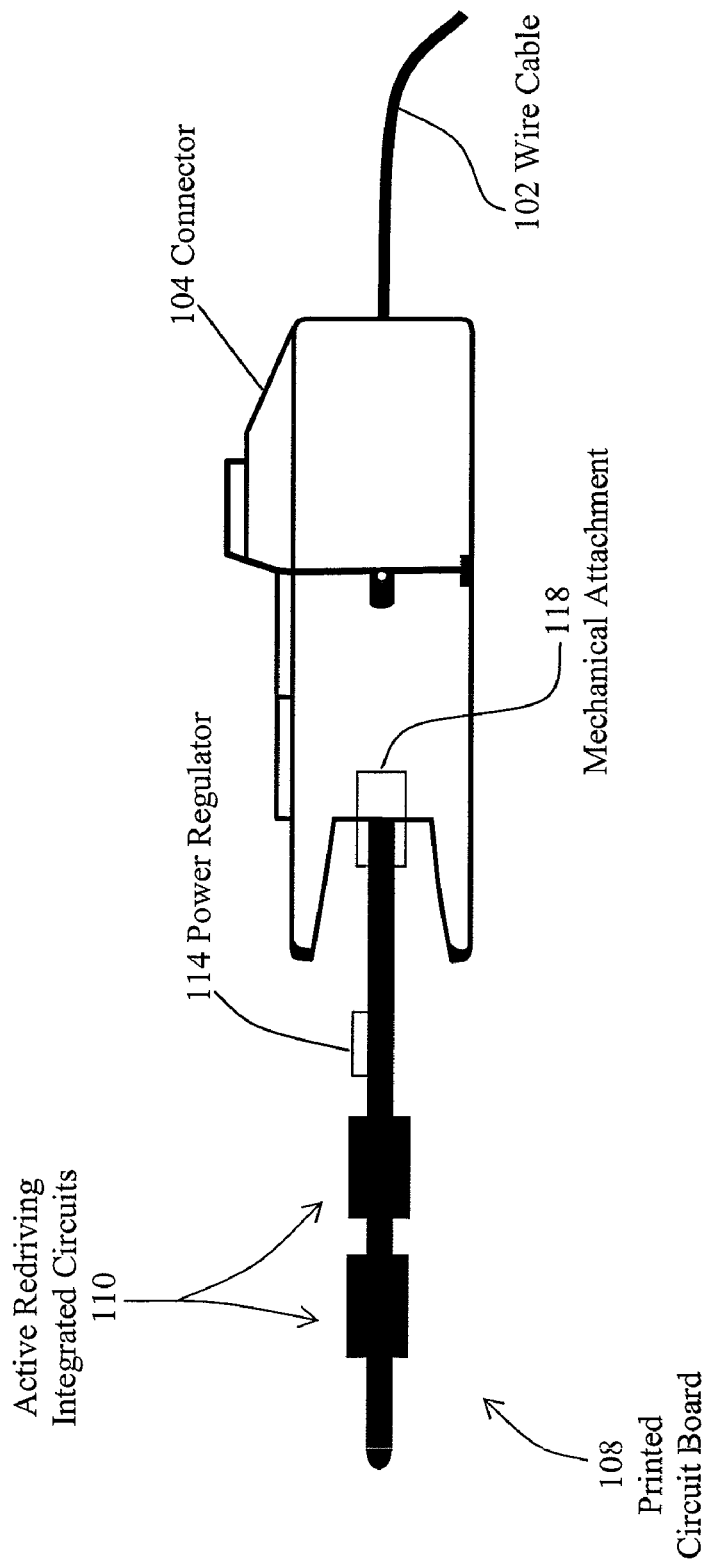
FIG. 2 is a side view of a portion of the embodiment illustrated in FIG. 1.

The printed circuit board 108, as illustrated in FIG. 1, plugs into, and is mechanically attached to, the connector 104 using mechanical attachment 118 (FIG. 2). Mechanical attachment 118 is schematically illustrated in FIG. 2, and any type of mechanical connection between the printed circuit board 108 and the connector 104 can be used including latches, screw connectors, hasps, hooks or other methods known in the art. The mechanical connection between the printed circuit board 108 and the connector 104 provides a secure mechanical and electrical connection between the connector 104 and the printed circuit board 108. The printed circuit board 108 can be constructed so that the mechanical connection employed by a standard connector 104 can be utilized to hold the printed circuit board 108 to the connector 104 using the existing mechanical attachment of the connector 104.

As also illustrated in FIG. 1, the connector 104 is connected by the wire cable 102 to the connector 106, which may comprise a standard serially attached SCSI cable system. Since neither the connector 104 nor the connector 106 are modified in any fashion, the printed circuit board 108 may be used with either connector 104 or connector 106. FIG. 2 is a side view of the connector 104 and the printed circuit board 108. As shown in FIG. 2, the printed circuit board 108 is inserted into and secured to the connector 104 using mechanical attachment 118. As disclosed above, the printed circuit board 108 can be connected to the connector 104 using any type of desired mechanical attachment 118. The active redriving integrated circuits 110 are mounted on both sides of the printed circuit board 108. Power regulator 114 is also shown attached to printed circuit board 108. As is clear from FIG. 2, the active redriving integrated circuits 110 and the power regulator 114 are mounted in the open environment inside the electronic device in which the internal cable system 100 is utilized so that the cooling system of the electronic device can be used to cool these active components. The active components, i.e., the active redriving integrated circuits 110 and the power regulator 114, generate a substantial amount of heat and must be cooled for proper operation. If the active components were encapsulated in plastic over-molding, a sufficient amount of heat could not be dissipated, resulting in the failure of the active components. The device in which the internal cable system is disposed normally includes cooling fans for circulating the air within the device. By allowing the active components to be exposed to the cooling flow circulation within the device, the active components are properly cooled and operate at proper operating temperatures. Hence, separate cooling of the active components is not required since the printed circuit board 108 is mounted externally to the connector 104 and takes advantage of the cooling air flow generated by the electronic device.

For proper utilization of the internal cable system 100 illustrated in FIG. 2, the electronic device using the internal cable system 100 must provide a powered port. The powered port (not shown) in the electronic device is disposed in a receptacle that connects to contacts 116 on the printed circuit board 108. It is desirable to allow the powered port in the electronic device to also operate with passive cables. In that regard, the powered ports must be able to operate in conditions in which the power supply pins in the port are shorted to ground potential, since ground connectors in the cable are utilized for power connections. Hence, a voltage sense pin can be used in the powered port to enable activation of power through the cable whenever the voltage sense pin does not detect a connection of the power pin to ground potential. Using this technique, application of power to a ground potential is avoided.

As indicated above, standard serially attached SCSI (SAS) cables may include passive components that are embedded within the over-molded plastic of the connectors, such as connector 104, illustrated in FIGS. 1 and 2. The passive components such as resistors, capacitors and inductors, help to tune the signals that are transmitted over the SAS cables. The printed circuit board 108 can be designed with active components to provide proper boosting and signal conditioning to assist in the signal integrity for various wire cable 102. The design of the printed circuit board 108 can be such that different passive components can be used to generate different levels of boosting, equalization and other signal conditioning functions based upon the length of the wire cable 102. Hence, a standard active component design can be used on a printed circuit board 108 with minor modifications of the passive components that are connected to the active components 110 on the printed circuit board 108 to accommodate different cable lengths.

Figure 3:
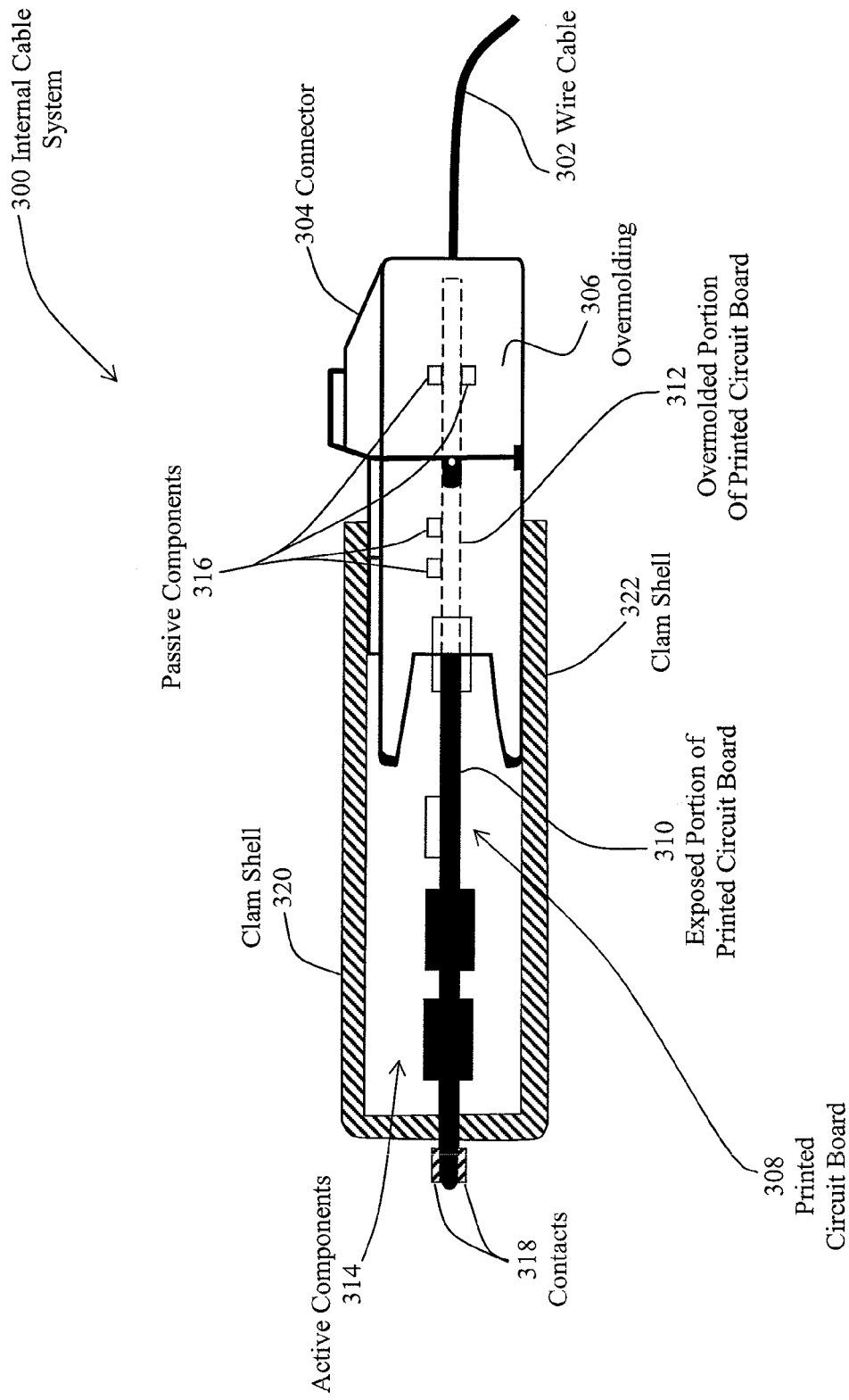
FIG. 3 is schematic side elevation of a portion of another embodiment of an internal cable system.

FIG. 3 is a schematic side elevation of a portion of another embodiment of an internal cable system 300. As shown in FIG. 3, a wire cable 302 is attached to the connector 304 having a plastic over-molding 306. Plastic over-molding 306 encapsulates the over-molded portion 312 of the printed circuit board 308. Passive components 316 may be disposed on the over-molded portion 312 of the printed circuit board 308. Active components 314, as well as passive components, can be mounted on the exposed portion 310 of the printed circuit board 308 to allow these components to be cooled by the cooling system of the electronic device. As also shown in FIG. 3, clam shells 320, 322 may be mounted directly to the connector 304 or form a portion of the over-molding 306 of the connector 304. The clam shell 320 may therefore comprise a plastic material such as a plastic material used for the over-molding 306 or can be metal or other material that is attached directly to the over-molding 306. The purpose of the clam shells 320, 322 is to provide additional support for the printed circuit board 308. The clam shells 320, 322 abut against the printed circuit board 308 to prevent movement in the vertical direction, as shown in FIG. 3. The abutment of the clam shells 320, 322 are adjacent to the contacts 318 and allow the contacts 318 to be exposed externally to the clam shells 320, 322. The clam shells 320, 322 can be made with slot openings, holes, etc. and can be open on the side portions, as indicated in FIG. 3 to allow the passage of air to the active components 314 mounted on the exposed portion 310 of the printed circuit board 308. Similarly, a claim shell, such as claim shells 320, 322, can be used in the embodiment disclosed in FIGS. 1 and 2 to provide additional support for the printed circuit board 108.

Hence, the embodiments of the internal cable system 100 are capable of enhancing signal integrity of signals that are transmitted on an internal cable using a simple one-piece design that takes advantage of the internal cooling of an electronic device in which the cable is used. Active components are used on a printed circuit board that is mechanically attached to a standard serially attached SCSI cable, or other internal signaling cable, which enhances signal integrity in a simple and inexpensive manner. The embodiments disclose a simple modification to an existing design which includes built-in drivers, repeaters, filters and/or equalizers to enhance signal integrity. Heat dissipation restrictions are minimized since the printed circuit board is mounted externally to the connector 104 and utilizes the cooling system of the electronic device in which the internal cable system 100 is utilized.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. An internal cable system that enhances signal integrity of signals transmitted over said internal cable system in an electronic device comprising:
    a wire cable;
    a printed circuit board that has a first portion that is connected to said wire cable and a second portion;
    at least one active redriving component circuit disposed on said second portion of said printed circuit board that processes signals transmitted over said internal cable system and enhances signal integrity of said signals;
    over-molding deposed directly on said first portion of said printed circuit board to form a covering over said first portion of said printed circuit board that holds said printed circuit board in a stationary position with respect to said over-molding, and allow said second portion of said printed circuit board to be exposed to cooling from said electronic device.

2. The internal cable system of claim 1 further comprising:
    a clam shell attached to said over-molding and disposed to abut against said printed circuit board to stabilize said printed circuit board, said clam shell having openings that allow air to pass over said active components to cool said active components.

3. The internal cable system of claim 1 wherein said at least one active redriving component circuit comprises an active signal boosting circuit.

4. The internal cable system of claim 3 wherein said at least one active redriving integrated circuit component circuit comprises an active filter circuit.

5. The internal cable system of claim 4 wherein said at least one active redriving integrated circuit component circuit further comprises an active redriving integrated equalization circuit.

6. The internal cable system of claim 4 wherein wire cable comprises a serially attached SCSI cable.

7. The internal cable system of claim 1 wherein said at least one active redriving component circuit comprises a power regulation circuit.

8. A method of enhancing the integrity of signals transmitted in an electronic device over an internal cable comprising:
    connecting a first portion of a printed circuit board to a wire cable;
    connecting passive components to said first portion of said printed circuit board;
    connecting active redriving amplification components, that are driven by a power signal, to a second portion of said printed circuit board;
    over-molding a plastic covering directly on said first portion of said printed circuit board, and not over said second portion of said printed circuit board, so that said second portion of said printed circuit board is not enclosed within said plastic covering, but is exposed to air flow from a cooling system of said electronic device;
    increasing signal integrity of said signals transmitted over said internal cable using said active redriving amplification components that are connected to said printed board.

9. The method of claim 8 wherein said process of increasing signal integrity comprises:
    boosting and conditioning said signals transmitted over said internal cable using said active redriving amplification components to increase signal to noise ratio of said signals.

10. The method of claim 9 further comprising:
    providing a serially attached SCSI cable as said internal cable.

11. The method of claim 10 wherein said process of increasing signal integrity comprises:
    increasing signal integrity of said signals transmitted over said internal cable using an active equalizer that utilizes active subtraction techniques that reduce crosstalk.

12. The method of claim 8 further comprising:
    regulating power supplied to said printed circuit board using a power regulator circuit.

13. The method of claim 8 further comprising:
    providing a clam shell over said second portion of said printed circuit board that stabilizes said second portion of said printed circuit board and has openings to allow air to pass through said clam shell.

* * * * *